United States Patent
Crose et al.

[11] Patent Number: 5,914,021
[45] Date of Patent: Jun. 22, 1999

[54] APPARATUS AND METHOD FOR CONTINUOUS EXTRACTION OF A CHARGED SUBSTANCE FROM A CONDUCTIVE FLUID

[75] Inventors: James R. Crose, Chelmsford; Sol L. Berg, North Andover, both of Mass.

[73] Assignee: IMSCO, Inc., North Andover, Mass.

[21] Appl. No.: 08/866,616

[22] Filed: May 30, 1997

Related U.S. Application Data

[63] Continuation-in-part of application No. 08/218,221, Mar. 25, 1994, Pat. No. 5,647,965, which is a continuation-in-part of application No. 08/168,956, Dec. 17, 1993, Pat. No. 5,443,709.

[51] Int. Cl.[6] ........................................................ A23F 5/20
[52] U.S. Cl. .................... 204/555; 204/554; 204/661; 204/665; 204/672; 204/660; 422/44; 426/239
[58] Field of Search ....................................... 204/555, 554, 204/660, 661, 663, 665, 672; 422/44; 210/748; 426/239

[56] References Cited

U.S. PATENT DOCUMENTS

| | | | |
|---|---|---|---|
| 3,729,402 | 4/1973 | Griswold | 204/665 |
| 4,349,430 | 9/1982 | Efimov et al. | 204/661 |
| 4,941,962 | 7/1990 | Inoue | 204/665 |
| 5,036,365 | 7/1991 | Landa | 204/665 |
| 5,393,416 | 2/1995 | Kozak et al. | 204/626 |

*Primary Examiner*—Kishor Mayekar
*Attorney, Agent, or Firm*—Coudert Brothers

[57] ABSTRACT

Apparatus and method for separating a charged substance from a conductive fluid in which the conductive fluid is transported to a charged substance separation assembly where an electrostatic field is imposed to separate the charged substance from the fluid which passes through a porous separator and is collected.

21 Claims, 7 Drawing Sheets

APPARATUS AND METHOD FOR CONTINUOUS EXTRACTION OF A CHARGED SUBSTANCE FROM A CONDUCTIVE FLUID

This is a continuation-in-part of U.S. application Ser. No. 08/218,221, filed Mar. 25, 1994, now U.S. Pat. No. 5,647,965 which is a continuation-in-part of U.S. Ser. No. 08/168,956 filed Dec. 17, 1993, now U.S. Pat. No. 5,443,709, both of which are incorporated herein by reference.

FIELD OF THE INVENTION

The present invention is directed to apparatus and methods for removing a charged substance from a conductive fluid by imposing an electrostatic field across a vessel having two chambers with a porous separator therebetween. The charged substance is directed to the lower, first chamber and retained therein and the conductive fluid with a reduced amount of the charged substance is passed through the separator into an upper, second chamber. The present invention is especially suited for the decaffeination of a caffeine-containing liquid, in a batch or continuous operation.

BACKGROUND OF THE INVENTION

The removal of a charged substance from a conductive fluid containing the same is disclosed in U.S. patent application Ser. No. 08/218,221 filed Mar. 25, 1994 owned by the Assignee herein, now U.S. Pat. No. 5,647,965, and which is incorporated herein by reference. The charged substance is drawn out of the flow path of the conductive fluid by the imposition of an electrostatic field. The charged substance is retained by a substrate comprised of an ionic resin.

A device and method for decaffeinating a caffeine-containing liquid (e.g. coffee) employing an electrostatic field generating assembly is disclosed by the Assignee herein in U.S. Pat. No. 5,443,709 and U.S. Pat. No. 5,503,724, each of which in incorporated herein by reference.

Applicants have sought to develop a system for the removal of a charged substance from a conductive fluid in which the process can be run batchwise or continuously. A continuously operating system can produce greater amounts of a conductive liquid with a reduced amount of the charged substance in a more economical way, and would be particularly suited for commercial separation applications. In addition, Applicants have sought to reach levels of charged substance removal that can produce exceptional tasting beverages such as decaffeinated coffee or tea.

It would therefore be a significant advance in the art of separating charged substances from a conductive liquid if apparatus and methods could be provided which enable the selective production of a liquid with a reduced amount of the charged substance in a cost effective and efficient manner for both batchwise and continuous applications.

It would be a further advance in the art if caffeine could be removed from a liquid containing the same (e.g. coffee or tea) without adversely affecting the taste of the resulting liquid.

SUMMARY OF THE INVENTION

The present invention is generally directed to apparatus and methods for removing a charged substance from a conductive fluid in which the charged substance can be effectively removed in a batchwise or continuous manner.

In particular, the present invention is directed, in part, to a device for removing a charged substance from a conductive liquid containing the same comprising:

a) channel means for transporting the conductive liquid to a charged substance separation means;
b) charged substance separation means comprising;
   i) a first inlet for receiving the conductive liquid from the channel means,
   (ii) a first chamber for receiving the conductive liquid from the channel means,
   (iii) a second chamber separated from the first chamber by a porous separator, said second chamber for collecting a liquid with a reduced amount of the charged substance,
   (iv) a porous separator having a sufficient porosity to allow said liquid free of the charged substance to pass therethrough, and
   (v) an electrostatic field generating means for impressing an electrostatic field to thereby cause the charged substance to be retained in the first chamber, while the liquid having a reduced amount of the charged substance passes through the separator into the second chamber.

Methods of separating the charged substance from a conductive liquid containing the same, also part of the present invention.

The present invention can be applied to large scale commercial separations as well as to separations performed in the home such as in devices for the separation of caffeine from a caffeine containing liquid (e.g. coffee or tea).

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention imposes an electrostatic field across a vessel divided into two chambers, preferably chambers having a curvilinear or domed profile, by a porous separator to separate a charged substance from a conductive liquid containing the same. As used herein the term "porous separator" shall mean a separator having sufficient porosity to allow the conductive liquid absent the charged substance to pass therethrough.

The conductive liquids which can be treated in accordance with the present invention include blood, liquids containing various chemical compounds, including pollutants and the like, ingestible liquids including potable water, coffee, tea and the like.

The charged substance contained within the conductive liquid is any substance which has an electrical charge and when in the presence of an electrostatic field can be repelled from or attracted to surfaces having the same or different polarities. An "electrostatic field generating means" as employed in the present invention shall mean a device which generates an electrostatic field across the vessel comprising two chambers separated by the porous separator so as to attract the charged substances thereto.

Figure 1:
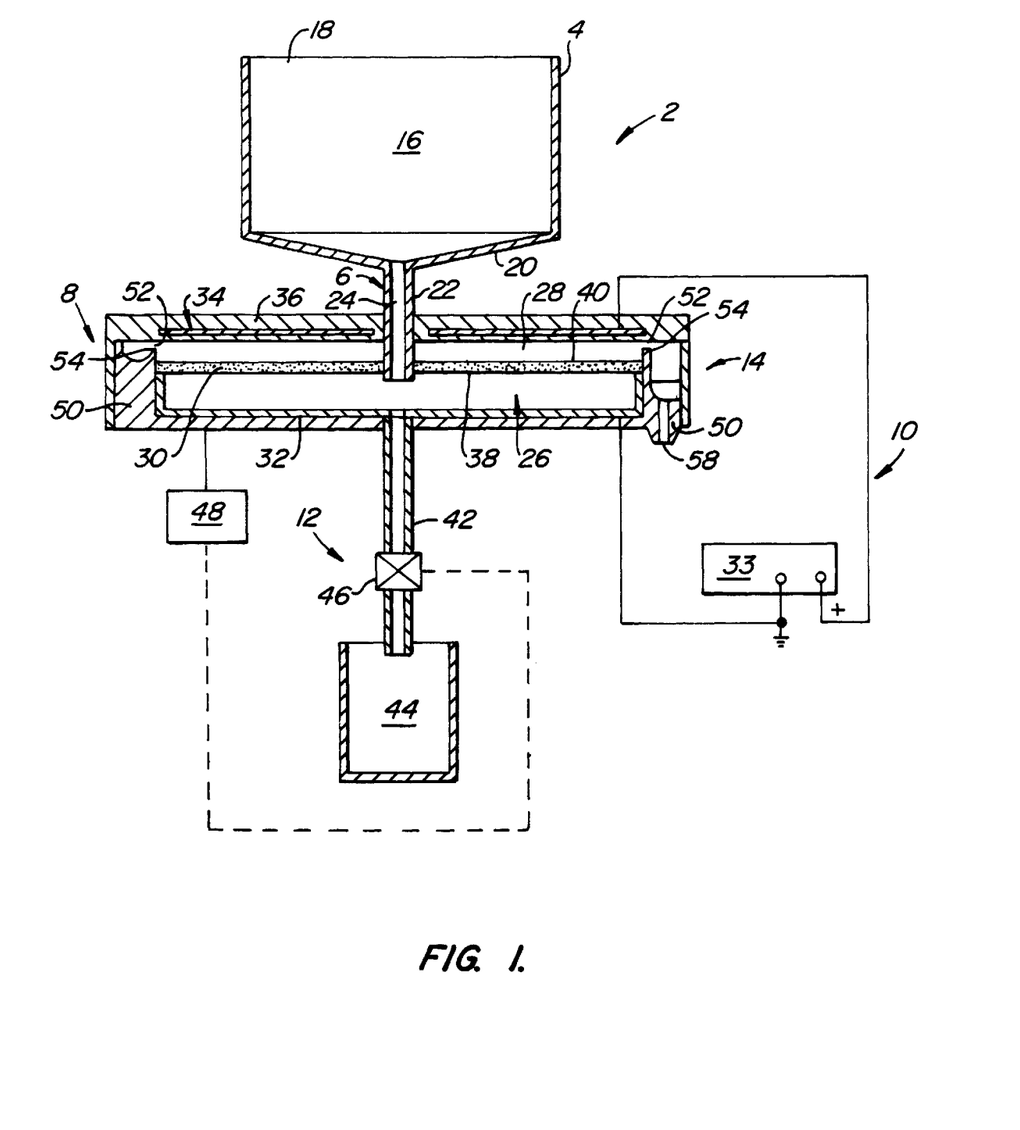
FIG. 1 is a cross-sectional side view of an embodiment of the invention for the continuous production of a liquid with a reduced amount of a charged substance.
Figure 2A:
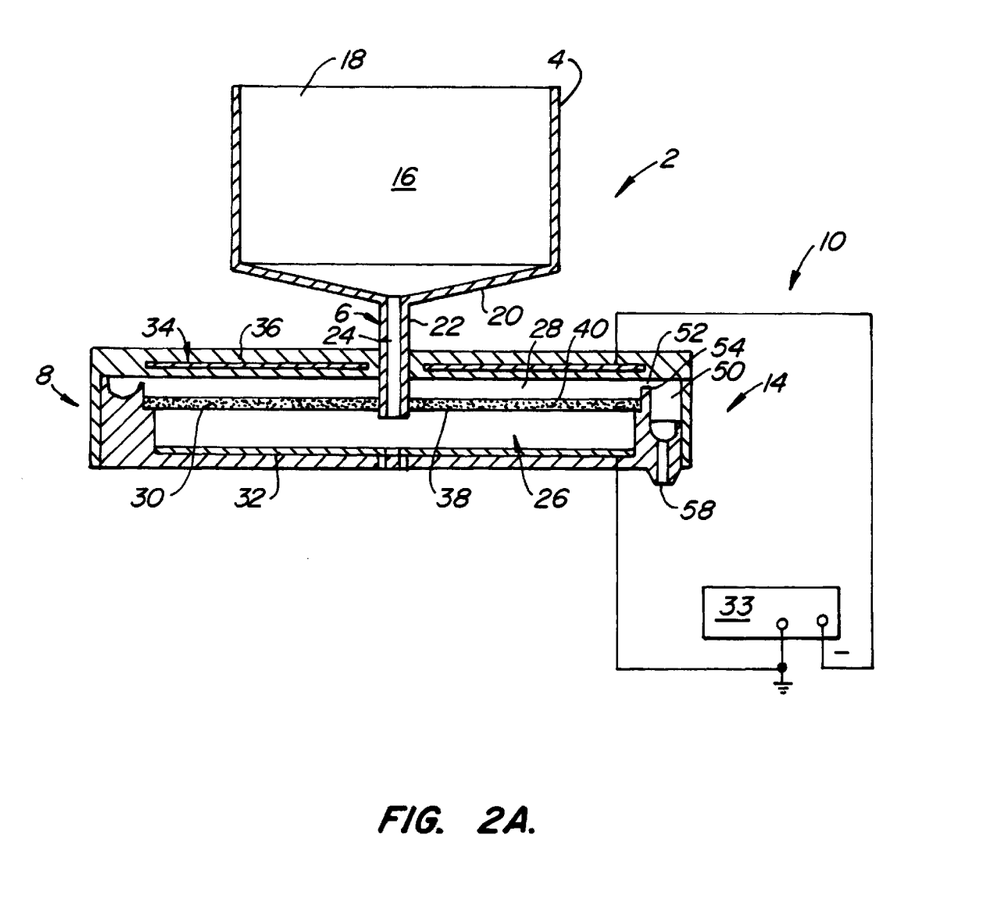
FIG. 2A is a cross-sectional side view of an embodiment of the invention for the batchwise production of a liquid with a reduced amount of the charged substance.
Figure 2B:
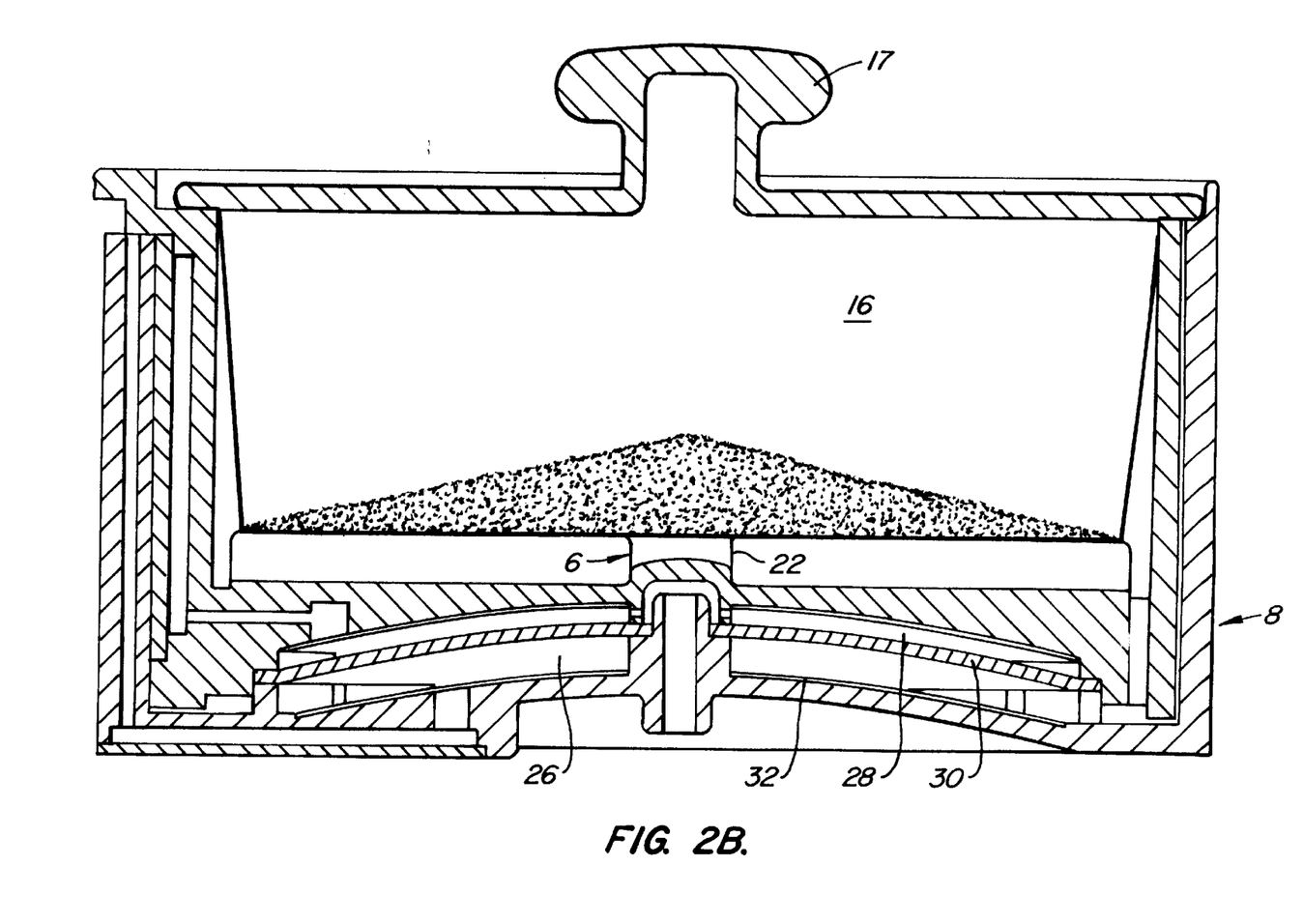
FIG. 2B is a cross-sectional view similar to FIG. 2A with the charged substance separation assembly having a curvilinear or domed shape.

Referring to FIGS. 1, 2A and 2B, there is shown a device 2 for separating a charged substance from a conductive liquid containing the same. The device 2 includes a receiver 4 for receiving the charged substance containing liquid (e.g. brewed coffee) and a channel 6 for delivering the liquid to a charged substance separation assembly 8.

Separation of the charged substance from the conductive liquid is initiated by the imposition of an electrostatic field generated by an electrostatic field generating assembly 10. The charged substance which is isolated in the separation assembly 8 is removed from the device 2 either through a discharge assembly 14 or through a valve assembly 12, as explained hereinafter. The valve assembly 12 controls the rate of removal of the charged substance and therefore is particularly suited to applications requiring the continuous removal of the charged substance. The liquid which has had the charged substance removed therefrom is itself removed from the device 2 through the discharge assembly 14.

The receiver 4 can be any device which can receive the conductive liquid and transport the same to the charged substance separation assembly 8. As shown specifically in FIGS. 1 and 2A, the receiver 4 comprises a reservoir 16 which may be in the shape of a cone having a upper opening 18 which is adapted to receive the charged substance containing liquid from a source (not shown). Throughout the description of the invention hereinafter specific reference will be made to a device for the decaffeination of a caffeine-containing liquid (e.g. coffee). It will be understood, however, that the present invention has numerous applications as previously described, including but not limited to, the separation of other charged substances from blood, water and the like.

Referring again to FIGS. 1, 2A and 2B, the source of the charged substance containing liquid may be a percolator or commercial device for preparing brewed coffee. The reservoir 16 is preferably a cylindrical body which allows a significant amount of the charged substance containing liquid to enter the charged substance separation assembly 8 of the device 2. The reservoir 16 may be provided with a cover 17, as shown specifically in FIG. 2B. In addition, the reservoir 16 also preferably has a funnel-shaped base 20 which directs the liquid within the reservoir 16 to the channel 6.

The channel 6 directs the flow of the charged substance containing liquid to the charged substance separation assembly 8. The channel 6 is preferably comprised of a tube 22 defining a cylindrical pathway 24 positioned along the longitudinal axis of the channel 6. The diameter of the pathway 24 is selected to exceed the flow rate through the porous separator as explained hereinafter.

The receiver 4 is made of a material which is substantially impervious to the charged-substance containing liquid and is readily washable. For the decaffeination of coffee, food grade polyethylene and polypropylene are suitable for this purpose.

The channel 6 delivers the charged substance containing fluid to the charged substance separation assembly 8 where the charged substance is separated from the liquid. The charged substance separation assembly 8 includes a first chamber 26 for receiving the liquid directly from the channel 6 and a second chamber 28. Both of the chambers 26, 28 are domed upwardly so as to purge any residual air entrained therein as shown specifically in FIG. 2B. The chambers 26, 28 are separated from each other by a porous separator 30 which allows the liquid with a reduced amount of the charged substance to pass therethrough and thereby move from the first chamber 26 to the second chamber 28. The porous separator may also be domed as shown in FIG. 2B.

The separator 30 has a first or bottom surface 38 contiguous with the first chamber 26 and a second or upper surface 40 contiguous with the second chamber 28. The thickness of the separator is typically in the range of from about 0.015 to 0.090 inch. The preferred materials for the separator include porous metals such as stainless steel as well as those materials disclosed in pending U.S. Patent Application Ser. No. 60/036,975 filed Jan. 29, 1997 which is incorporated herein by reference. The preferred synthetic materials for the separation assembly 8 include polymers, containing at least one amine reactive functionality, preferably with each polymeric unit containing at least one amine reactive functionality. Such functionalities include carboxyl groups, sulfonic groups and nitric groups. The preferred groups are carboxyl groups and sulfonic groups.

The polymer may be in the form of a fiber. A preferred fiber material is methylcellulose, especially carboxymethylcellulose such as Aqualon® from Hercules Inc. The polymer can also be in the form of a polymeric microsphere having a diameter typically no more than 500 microns. One such polymer meeting this criteria is Dowex® sold by the Dow Chemical Company. This polymer contains sulfonic acid groups attached to a polystyrene polymeric chain which may be cross-linked with divinyl benzene.

The polymeric materials described above can be used to separate a variety of charged substances from liquids but is especially useful in separating caffeine from a liquid containing the same such as coffee or tea.

Referring again to FIGS. 1, 2A and 2B, the first chamber 26 is formed in part from a conductive material such as a metal plate or a metal cylinder 32 which is connected electrically to ground. The separator 30 maybe in contact with the metal cylinder 32 and if so, together may serve as a ground electrode thereby defining the first chamber 26. The separator 30 in the embodiment of FIG. 2B may also have a domed shape.

The electrostatic field generating assembly 10 includes a power source 33 and an electrode 34 surrounded by insulation 36. The electrode 34 is connected to the power source 33 as is the metal plate or cylinder 32 which represents the ground electrode.

In the embodiment of the invention shown in FIG. 1, charged caffeine molecules are removed from liquid coffee in the following manner. By design, the surface defining the first chamber 26 including the surface 38 of the separator 30 and the metal cylinder 32 are made negative or ground. By induction any positive ions surrounding the negatively charged functional resin groups within the separator 30 are displaced to ground leaving negatively charged sites in the separator 30. As positively charged caffeine molecules enter the first chamber 26 they are initially attracted to the negative surfaces as described above. As charges are collected thereon those surfaces change to one of opposite polarity and begin to repel similar point charges. In addition, water molecules from the caffeine containing liquid are dipolar and when within the applied external electrostatic field the water molecules seek to polarize and align themselves between the metal cylinder 32 and the electrode 34. The positive ends of the water dipole face the negative ground, electrode 32.

As the caffeine molecules continously enter the first chamber 26 and are subsequently repelled, the concentration of caffeine molecules begins to increase within the first chamber 26. As the concentration of point charges from the caffeine molecules increases there is an associative increase in energy which thereby develops an internal space charge. When the internal space charge exceeds the applied electrostatic field the previous dipole orientation of the water molecules are then caused to realign (that is the positive ends of the water dipole now face the positive electrode 34) within the dominant field. The ability of the system to thereafter contain the caffeine molecules within the first chamber 26 rapidly decreases. As a consequence the positively charged caffeine molecules are drawn into and through the porous separator 30 into the second chamber 28. The passage of the caffeine into the second chamber 28 reduces the space charge in the first chamber 26 to a level below the applied voltage causing the system to again undergo a reversal of polarity thereby making it suitable for accepting and treating the caffeine containing liquid.

In a batchwise system, as best shown in FIGS. 2A and 2B, the amount of caffeine to be removed is finite and establishes the amount of the active resin required within the separator which neutralizes or limits the space charge below that critical point heretofore defined. In a batchwise system the separator is simply a throwaway, replacement element.

In accordance with another aspect of the present invention, the production of the liquid substantially free of the charged substance can be conducted in a continuous manner.

Referring again to FIG. 1, in a continuous operating mode, the concentration of caffeine and therefore the space charge is controlled by the valve assembly 12. Adjustment of the valve causes an adjustment in the flow rate of the liquid so that the caffeine concentration does not exceed the external electrostatic field.

The valve assembly 12 includes a channel 42 providing flow communication between the first chamber 26 of the charged substance separation assembly 8 and a charged substance collector 44 where the charged substance is collected and removed from the device 2 as explained hereinafter. Positioned within the channel 42 is a valve 46 which controls the flow rate of the charged substance from the first chamber 26. The position of the valve 46 and therefore the flow rate is dependent upon the concentration of the charged substance within the first chamber 26.

In the embodiment of the present invention shown in FIG. 1, the space charge or caffeine concentration is controlled and does not exceed the applied external electrostatic field and therefore the charged substance is prevented from passing through the separator 30. The concentration of the charged substance is always maintained below a predetermined value, so that the total number of molecules of the charged substance is insufficient to provide a space charge which exceeds the applied external voltage.

Referring specifically to FIG. 1, a sensor 48 detects the concentration of the charged substance within the first chamber 26. The concentration is compared to a predetermined fixed concentration at which the space charge approaches the applied external electrostatic field. When the actual concentration of the charged substance approaches the predetermined concentration, a signal is generated which adjusts the opening of the valve 46 to enable the charged substance in the first chamber 26 to proceed through the channel 42 into the collector 44 thereby controlling the concentration of the charged substance in the first chamber 26.

Continuous operation of the valve 46 maintains the concentration of the charged substance below the level at which the space charge exceeds the applied external electrostatic field. Therefore, the charged substance does not typically pass through the separator 30 into the second chamber 28, but is instead, directed toward the charged substance collector 44 and only the liquid with a reduced amount of the charged substance passes into the second chamber 28.

The discharge assembly 14 includes a circumferential manifold 50 which encircles the second chamber 28. A ridge 54 separates the second chamber 28 from the manifold 50. Flow communication between the second chamber 28 and the manifold 50 occurs by a circumferential gap 52. The height of the ridge 54 exceeds the height of the liquid in the second chamber 28. To facilitate drainage of the liquid, the manifold 50 is preferably divided into two parts where each part is pitched from a high point opposite a discharge port 58 around one half of the circumference down to the discharge port 58.

Liquid, after the second chamber is filled, is displaced circumferentially over the ridge 54 through the gap 52. The liquid is then collected by the manifold 50 and directed to the discharge port 58.

The present invention is especially suited to the decaffeination of a caffeine-containing liquid such as coffee or tea. The device can be incorporated into commercial grade brewing machines as well as to household devices used for the brewing of as little as one cup of coffee. The device of the present invention can be incorporated into a number of locations of a brewing device including the brewing basket and the vessel (e.g. a carafe) which holds the final product.

Figure 3A:
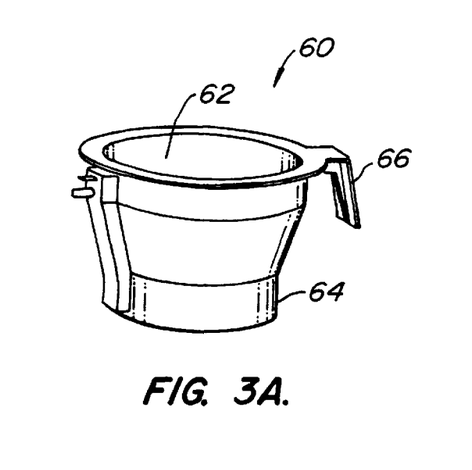
FIG. 3A is a basket for use in the brewing of coffee which can be adapted to include the device of the present invention.
Figure 3B:
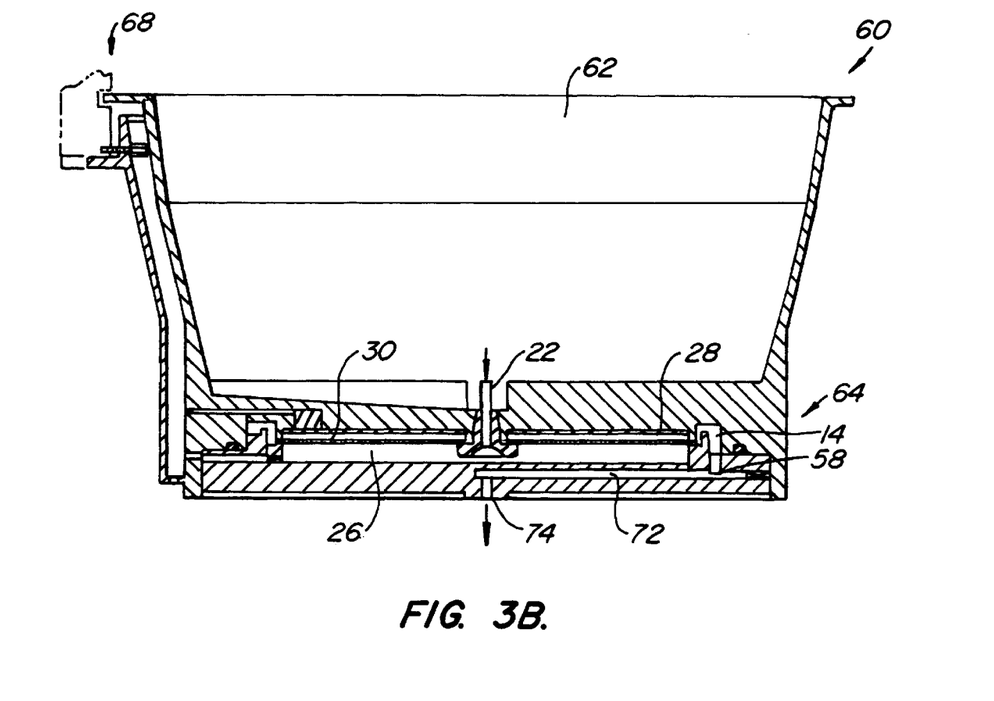
FIG. 3B is a cross-sectional view of a charged substance separation assembly for use in the basket of FIG. 3A of a coffee maker to remove caffeine therefrom.

Referring to FIGS. 3A–3B, there is shown an embodiment wherein the device of the present invention is incorporated into the basket assembly of a typical drip coffee maker. The basket assembly 60 includes a reservoir 62, a base 64 at the bottom of the reservoir, a handle 66 which can optionally be detachable, and an electrical connector 68 adapted for electrical connection to a coffee maker. (See FIG. 3B)

As shown specifically in FIG. 3B the charged substance separation assembly 8 of the type shown and described in connection with FIGS. 1–2B is provided within the base 64 of the basket 60 assembly. Removal of the charged substance (e.g. caffeine) from the liquid containing the same is accomplished in a manner similar to that previously described. The brewed coffee is formed in the reservoir 62 and is transported to the charged substance separator assembly 8 through the tube 22 into the first chamber 26. The supplying of power from a power source imposes an electrostatic field between the electrode and metal cylinder which retains the charged substance in the first chamber 26. Liquid with a reduced amount of the charged substance passes through the separator 30 to the discharge assembly 14.

As shown specifically in the embodiment of FIG. 3B, the discharge assembly 14 is provided with a channel 72 that transports the liquid from the discharge port 58 previously described, which is located at one side of the separation assembly 8, to a second discharge port 74 located centrally on the bottomside of the basket. In this way, the liquid with a reduced amount of the charged substance passes through the second discharge port 74 directly into a suitable receptacle such as a carafe or the like.

The power to generate the electrostatic field may be located within the coffee brewer in a customary manner or by a battery located within a detachable handle. The power supply should be located remote from the basket assembly 60 to facilitate cleaning.

Figure 3C:
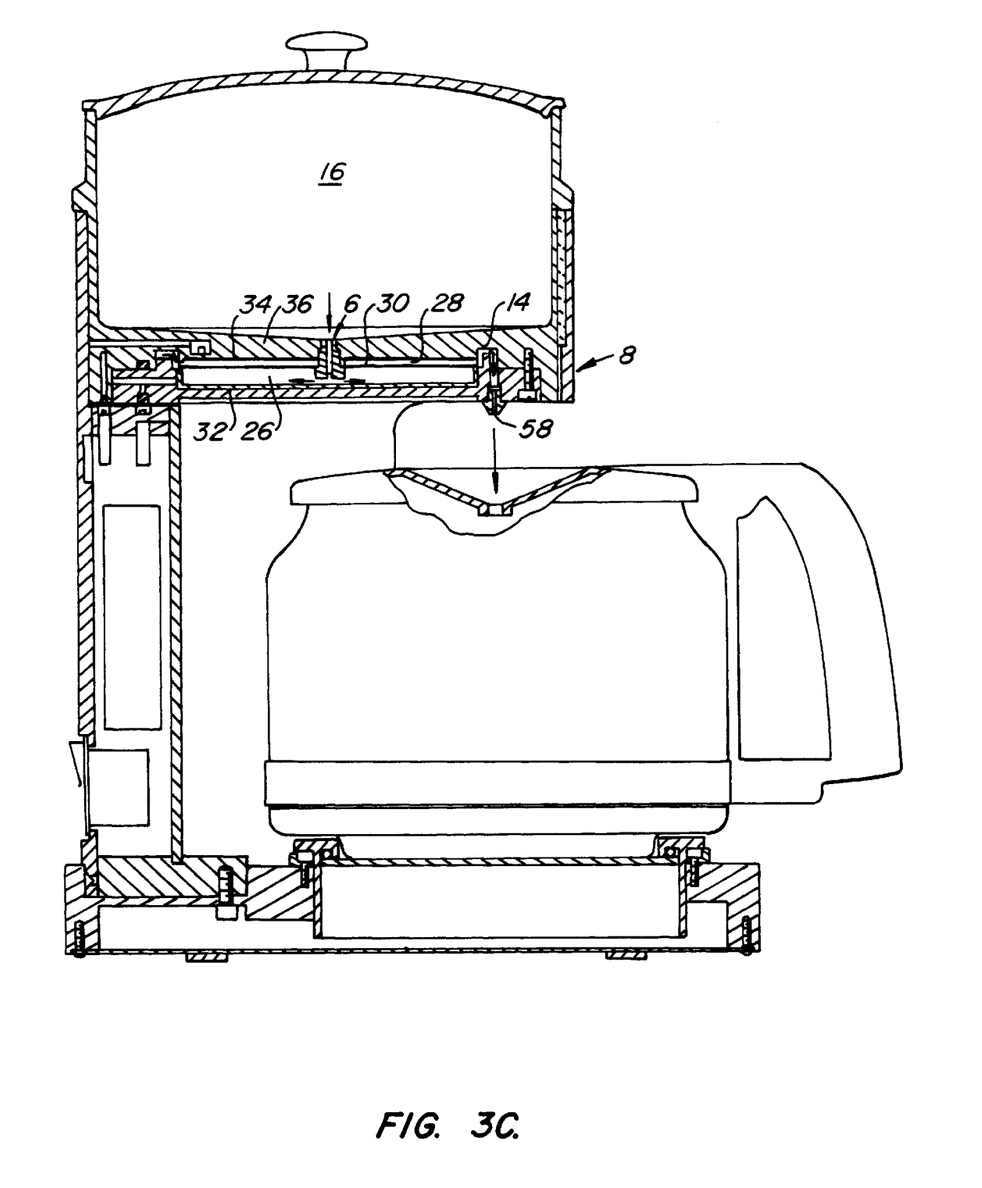
FIG. 3C is a cross-sectional view of a drip coffee maker containing a charged substance separation assembly of the present invention.

A further embodiment of the invention is shown in FIG. 3C. The charged substance separation assembly 8 is positioned at the base of a drip coffee maker. The operation of the separation assembly is as described in FIGS. 1–2B.

The brewed coffee from the reservoir 16 passes through the channel 6 into the first chamber 26. An electrostatic field is imposed by the insulated electrode 34 and the metal cylinder 32 through a power source 33 located in a housing 76 of the drip coffee maker. The reduced caffeine liquid produced in the first chamber 26 passes through the porous separator 30 into the second chamber and eventually out of the discharge port 58 into the carafe.

Figure 4:
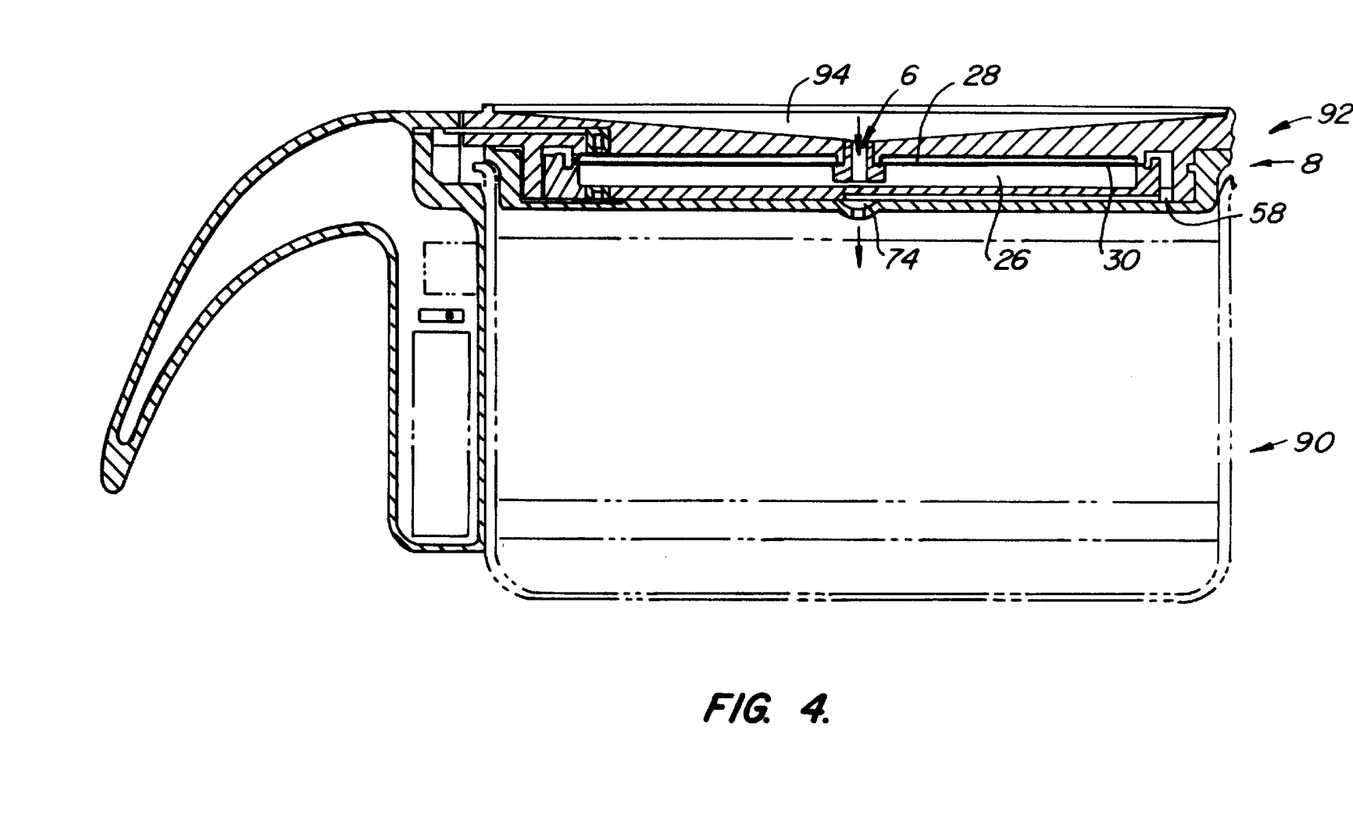
FIG. 4 is a cross-sectional view of a carafe containing a charged substance separation assembly for use in a drip coffee maker to remove caffeine therefrom.

In another embodiment of the invention, the carafe of a drip coffee maker is provided with the device of the invention. Referring to FIG. 4, there is shown a carafe 90 of a drip coffee maker having in the cover 92 thereof a charged substance separation assembly 8 of the present invention such as shown and described in connection with FIGS. 1–2B.

Brewed coffee enters a reservoir 94 and flows through the channel 6 into the first chamber 26. Upon the imposition of an electrostatic field as previously explained, the desired liquid product (e.g. decaffeinated coffee) flows into the second chamber 28 and through the discharge assembly 14 and eventually through the first discharge port 58 and out of the second discharge port 74 into the carafe 90. The liquid from the discharge port 58 is directed into the center of the carafe cover 92 by a channel, preferably a rectangular-shaped channel formed in the base of the metal cylinder 32.

In another embodiment of the invention the device of the present invention may be incorporated into a single cup decaffeination assembly. The single cup decaffeinator can be used to prepare freshly brewed decaffeinated coffee or to decaffeinate previously brewed coffee.

Figure 5:
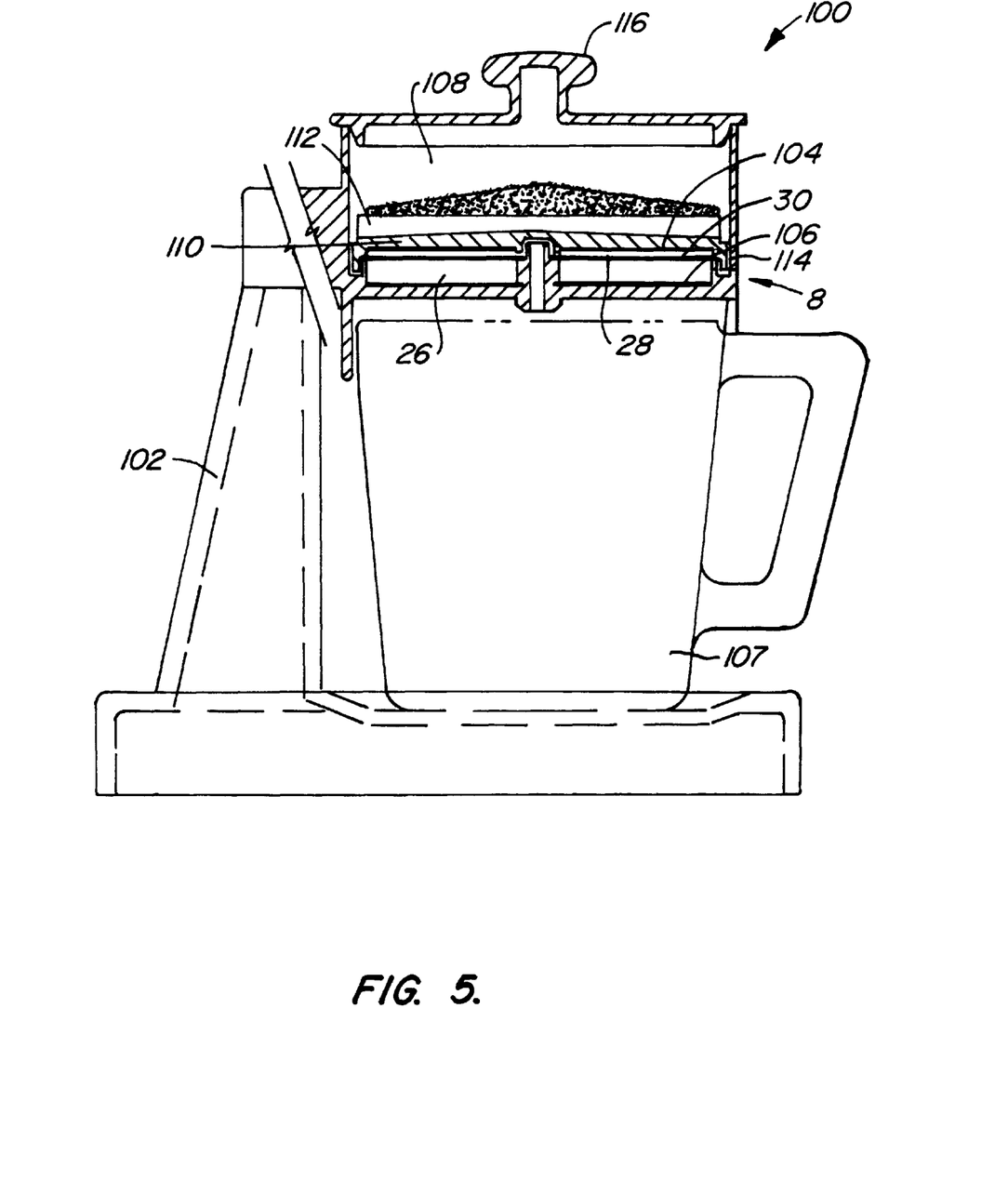
FIG. 5 is cross-sectional view of another embodiment of the invention particularly adapted for brewing and decaffeination of a single cup of a caffeine-containing liquid.

Referring to FIG. 5 there is shown a single cup decaffeinator assembly 100 which is supported by a stand 102 and which contains a charged substance separator assembly 8. The stand 102 houses the required electronics necessary to generate the electrostatic field as previously shown in connection with FIGS. 1–2B. The electrostatic field is generated between an insulated positive electrode 104 and the open, negative, ground electrode 106 in the form of a metal plate. The stand 102 supports and aligns the charged substance separator assembly 8 with a cup 107.

An appropriate coffee filter and ground coffee is placed within a reservoir 108 and rests on a conical plate 110 having associated ribs 112 to support the filter/coffee combination when hot water is introduced. Alternatively, previously brewed coffee may be introduced directly into the decaffeinator assembly 100.

Brewed coffee, after passing through the filter or just poured into the housing is caused to flow, because of the conical geometry, between the ribs 112 towards the outer rim of the conical plate 110 where a plurality of vertical, circumferential grooves 114 direct the liquid to the first chamber 26. As the first chamber 26 fills with brewed coffee an electrostatic field is imposed so that the liquid with a reduced amount of caffeine passes through the separator 30 into the second chamber 28 and continues towards the discharge assembly 14. A cover 116 is placed over the reservoir 108 to retain thermal energy.

What is claimed is:

1. A device for removing a charged substance from a conductive liquid containing the same comprising:
   a) channel means for transporting the conductive liquid to a charged substance separation means; and
   b) the charged substance separation means comprising,
      (i) a first inlet for receiving the conductive liquid from the channel means;
      (ii) a first chamber for receiving the conductive liquid from the channel means;
      (iii) a second chamber separated from the first chamber by a porous separator, said second chamber for collecting a liquid having a reduced amount of the charged substance;
      (iv) the porous separator having sufficient porosity to allow said liquid with a reduced amount of the charged substance to pass therethrough; and
      (v) an electrostatic field generating means for impressing an electrostatic field across the charged substance separation means between the first chamber and the second chamber to cause the charged substance to be retained in the first chamber while allowing the liquid having a reduced amount of the charged substance to pass through the separator into the second chamber.

2. The device of claim 1 further comprising collection means for collecting the liquid having a reduced amount of the charged substance.

3. The device of claim 1 wherein the collection means comprises a reservoir for receiving the liquid having a reduced amount of the charged substance from the second chamber and a discharge port for discharging said liquid from the reservoir.

4. The device of claim 1 further comprising charged substance discharging means operatively connected to the first chamber for discharging the charged substance retained in the first chamber.

5. The device of claim 1 wherein the charged substance discharging means comprises:
   (i) a channel connected at one end to the first chamber and at an opposed end to an outlet; and
   (ii) valve means for regulating the flow of the charged substance from the first chamber to the outlet.

6. The device of claim 5 wherein the valve means comprises sensor means for detecting the concentration of the charged substance within the first chamber and for generating a first signal corresponding to said detected concentration, means for comparing the difference between the first signal and a selected concentration level of the charged substance and for generating a second signal corresponding to said difference, and means for adjusting a valve within the channel to allow the charged substance to flow out of the first chamber until the difference between the first signal and the selected concentration approaches zero.

7. The device of claim 6 further comprising a vessel for receiving the charged substance from the outlet.

8. The device of claim 1 wherein the first chamber, the second chamber and the porous separator have a domed shape.

9. The device of claim 1 wherein the porous separator is made from a material selected from the group consisting of porous metals and polymeric materials.

10. The device of claim 1 wherein the electrostatic field generating means comprises an insulated electrode and a metal cylinder each connected to a power source.

11. The device of claim 1 wherein the charged substance separation means is contained within a basket of a coffee maker.

12. The device of claim 1 wherein the channel means is contained within a lid of a carafe of a drip coffee maker.

13. The device of claim 1 wherein the porous separator has a thickness of from about 0.015 to 0.090 inch.

14. The device of claim 1 wherein the charged substance is caffeine.

15. A device for removing caffeine from a beverage comprising,
   a) a first chamber having an inlet;
   b) a second chamber having an outlet and separated from the first chamber by a porous separator;
   c) a first electrode located in the first chamber on a surface opposite to the separator;
   d) a second electrode surrounded by an insulating material and located adjacent to the second chamber on a surface opposite to the separator;
   e) electrical connectors attached to the first and second electrodes; and
   f) means for generating an electrostatic field across the first electrode and the second electrode and between the first chamber and the second chamber to cause caffeine molecules to be retained in the first chamber while allowing the beverage having a reduced amount of caffeine to pass through the separator into the second chamber.

16. The device of claim 15 wherein the separator comprises a polymer.

17. The device of claim 16 wherein the polymer comprises at least one amine reactive functionality.

18. An apparatus for brewing coffee or tea comprising a device for removing caffeine from brewed coffee or tea comprising,
   a) a first chamber having an inlet;
   b) a second chamber having an outlet and separated from the first chamber by a porous separator;
   c) a first electrode located in the first chamber on a surface opposite to the separator;
   d) a second electrode surrounded by an insulating material and located adjacent to the second chamber on a surface opposite to the separator;
   e) electrical connectors attached to the first and second electrodes; and
   f) means for generating an electrostatic field across the first electrode and the second electrode and between the first chamber and the second chamber to cause caffeine molecules to be retained in the first chamber while allowing the beverage having a reduced amount of caffeine to pass through the separator into the second chamber.

19. The device of claim 18 wherein the caffeine removing device is located in a coffee-grounds or tea-leaf holding element of the brewing apparatus.

20. The device of claim 18 wherein the caffeine removing device is located in a carafe element of the brewing apparatus.

21. A method for removing a charged substance from a conductive fluid containing the same comprising:
   a) transporting the conductive fluid to an inlet of a charged substance separation device;
   b) passing the conductive fluid into a first chamber of the charged substance separation device;
   c) impressing an electrostatic field across the first chamber and across a second chamber of the charged substance separation device to cause the charged substance to be retained in the first chamber; and
   d) passing a liquid containing a reduced amount of said charged substance through a porous separator and into the second chamber.

* * * * *